US008738205B2

(12) United States Patent
Steuernagel et al.

(10) Patent No.: US 8,738,205 B2
(45) Date of Patent: May 27, 2014

(54) METHOD AND DEVICE FOR DETERMINING THE BEGINNING OF A START PHASE OF AN INTERNAL COMBUSTION ENGINE IN A HYBRID VEHICLE

(75) Inventors: Frank Steuernagel, Stuttgart (DE);
Alexander Maass, Ludwigsburg (DE);
Andreas Seel, Bonn (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 13/320,786

(22) PCT Filed: Apr. 20, 2010

(86) PCT No.: PCT/EP2010/055152
§ 371 (c)(1),
(2), (4) Date: Jan. 24, 2012

(87) PCT Pub. No.: WO2010/145863
PCT Pub. Date: Dec. 23, 2010

(65) Prior Publication Data
US 2012/0130579 A1 May 24, 2012

(30) Foreign Application Priority Data

Jun. 17, 2009 (DE) .......................... 10 2009 027 001

(51) Int. Cl.
*B60K 6/24* (2007.10)
(52) U.S. Cl.
USPC ........................................................ 701/22
(58) Field of Classification Search
None
See application file for complete search history.

(56) References Cited

U.S. PATENT DOCUMENTS

| 2003/0088343 | A1 | 5/2003 | Ochiai et al. |
| 2009/0105038 | A1 | 4/2009 | Weiss et al. |
| 2009/0124453 | A1 | 5/2009 | Seel et al. |
| 2010/0151990 | A1 | 6/2010 | Seel |
| 2010/0167869 | A1 | 7/2010 | Falkenstein et al. |

FOREIGN PATENT DOCUMENTS

| CN | 101163617 | 4/2008 |
| CN | 101259844 | 9/2008 |
| DE | 102006008640 | 8/2007 |
| DE | 10 2006 044 773 | 10/2007 |
| DE | 102006048355 | 4/2008 |
| DE | 102007010770 | 9/2008 |
| DE | 102007019988 | 11/2008 |
| DE | 102007023164 | 11/2008 |
| EP | 1366949 | 12/2003 |
| JP | 2000-177412 | 6/2000 |

(Continued)

OTHER PUBLICATIONS

International Search Report, PCT International Application No. PCT/EP2010/055152, dated Jul. 6, 2010.

*Primary Examiner* — Thomas Tarcza
*Assistant Examiner* — Garrett Evans
(74) *Attorney, Agent, or Firm* — Kenyon & Kenyon LLP

(57) ABSTRACT

A method for determining the beginning of a start phase of an internal combustion engine in a hybrid vehicle, in which a second drive unit drives the hybrid vehicle, the internal combustion engine being started upon reaching a certain drive torque of the second drive unit. In order to always be able to achieve the maximum solely electric driving range of the hybrid vehicle using the second drive unit and simultaneously improve the driving comfort of the hybrid vehicle by optimizing the internal combustion engine start triggering, the internal combustion engine is started when a predicted drive torque of the second drive unit is less than or equal to the drive torque, as instantaneously measured and increased by a torque reserve, of the second drive unit.

17 Claims, 4 Drawing Sheets

(56) References Cited

FOREIGN PATENT DOCUMENTS

| | | |
|---|---|---|
| JP | 2003-165348 | 6/2003 |
| JP | 2006-132448 | 5/2006 |
| JP | 2008-254725 | 10/2008 |
| JP | 2009-96340 | 4/2009 |
| WO | WO 2007/099018 | 9/2007 |
| WO | WO 2008/043593 | 4/2008 |
| WO | WO 2008/043712 | 4/2008 |

METHOD AND DEVICE FOR DETERMINING THE BEGINNING OF A START PHASE OF AN INTERNAL COMBUSTION ENGINE IN A HYBRID VEHICLE

FIELD OF THE INVENTION

The present invention relates to a method for determining the beginning of a start phase of an internal combustion engine in a hybrid vehicle, in which a second drive unit drives the hybrid vehicle, the internal combustion engine being started upon reaching a certain drive torque of the second drive unit, as well as a device for performing the method.

BACKGROUND INFORMATION

Vehicles having a hybrid drive structure have an internal combustion engine and typically an electric motor as a second drive unit. The drive torque may thus be applied by both drive assemblies during the driving operation of the hybrid vehicle.

In a so-called parallel hybrid, the electric motor is situated on the shaft of the internal combustion engine, the electric motor being connected to the internal combustion engine via a clutch. If the hybrid vehicle is solely driven by the electric motor, the power of the hybrid vehicle is limited by a maximum drive torque of the electric motor. If this maximum drive torque is no longer sufficient to meet the driver intention for further acceleration of the hybrid vehicle, the clutch is engaged, the electric motor dragging the internal combustion engine and thus starting it. From this point in time, both the electric motor and the internal combustion engine contribute to driving the hybrid vehicle.

During the internal combustion engine start phase, the electric motor must apply the drag torque for the internal combustion engine in addition to the vehicle drive torque. It may occur that the electric motor can no longer provide sufficient torque for the simultaneous drive of the hybrid vehicle and the drag torque, since the available drive torque decreases in the event of a rising speed of the electric motor, for example. In this case, the vehicle acceleration collapses with an uncomfortable jerk which is perceptible by the driver.

SUMMARY

An example method according to the present invention for determining the beginning of a start phase or an internal combustion engine start triggering of an internal combustion engine in a hybrid vehicle may have the advantage that the maximum solely electrical driving range of the hybrid vehicle is always achieved using the second drive unit, the driving comfort of the hybrid vehicle being improved by an optimized internal combustion engine start triggering. Because the internal combustion engine is started at a point in time when a predicted drive torque of the second drive unit is less than or equal to the instantaneously measured drive torque of the second drive unit, which is increased by a torque reserve, the optimum point in time of the beginning of the start phase of the internal combustion engine is set. It is ensured that during the internal combustion engine starting sequence, the second drive unit does not reach a torque limit, but rather the provided drive torque is ideally just sufficient to still start the internal combustion engine smoothly. Fixed applications, which either cause an excessively early start of the internal combustion engine, whereby the driving range of the second drive unit is restricted excessively early, or an excessively late start of the internal combustion engine, by which a collapse of the vehicle acceleration and therefore a perceptible comfort loss is caused due to the jerk in the vehicle, may therefore be dispensed with.

The predicted drive torque of the second drive unit, which is designed as an electric motor, is advantageously ascertained as a function of a speed change of the electric motor during the start phase of the internal combustion engine. A smooth internal combustion engine start is ensured by a timely internal combustion engine start triggering through the continuous predetermination of the available drive torque of the electric motor during electrical driving.

In one design, the speed change of the electric motor is ascertained from a speed at the beginning of the start phase of the internal combustion engine, e.g., when the internal combustion engine begins to turn over, and a predetermined speed at the end of the start phase of the internal combustion engine, e.g., when the internal combustion engine has completed the first injections and ignitions, the speed at the beginning of the start phase of the internal combustion engine being determined at the point in time of the measurement of the instantaneous drive torque. Proceeding from the instantaneous drive torque of the electric motor at the beginning of the start phase of the internal combustion engine, the predicted drive torque of the electric motor, which is used as a decision criterion for initiating the start phase of the internal combustion engine, is determined based on the predetermined speed at the end of the start phase.

In one refinement, to simplify the calculation, the speed change of the second drive unit is assumed to be a constant value during the start phase, which is added to the speed ascertained at the beginning of the start phase of the internal combustion engine in the case of a rising speed curve and is subtracted in the case of a sinking speed curve of the second drive unit. In the case of a rising speed curve, the beginning of the start phase or also the internal combustion engine start triggering typically occurs earlier; in the case of a sinking speed curve, it typically occurs later. The predicted drive torque of the electric motor may be reliably determined using such a fixed offset.

Alternatively, the predetermined speed at the end of the start phase of the internal combustion engine is determined from a preceding speed development or a current speed development of the electric motor. The speed difference thus resulting is variable, which allows better approximation of the predicted drive torque of the electric motor to the actually provided conditions of the hybrid vehicle.

The speed change or the speed at the start beginning and at the start end of the internal combustion engine is advantageously ascertained from an intended drive torque set by the driver of the hybrid vehicle. This method also results in a variable setting of the speed difference, since different predetermined speeds are ascertained at the end of the start phase of the internal combustion engine as a function of the intended drive torque.

In one refinement of the present invention, the speed change or the speed at the beginning of the start phase of the internal combustion engine and the speed at the end of the start phase of the internal combustion engine are corrected via a known transmission ratio of a transmission in the case of a displayed, ascertained, predicted, or expected gear change of the hybrid vehicle. This adaptation of the speed change also allows an optimum determination of the predicted drive torque of the electric motor to the actual driving behavior of the hybrid vehicle.

The predicted drive torque of the electric motor is advantageously repeated regularly during the operation of the electric motor, in particular at predefined time intervals. It is thus ensured that the start phase of the internal combustion engine may always be initiated at the optimum point in time as a function of the particular concrete requirements for the driving operation, in that the current requirements for the driving operation are continuously monitored.

In one embodiment, the ascertainment of the predicted drive torque of the electric motor is performed at a constant power starting at the nominal speed of the electric motor. This procedure represents a particularly comfortable determination of the predicted drive torque, since the behavior of the electric motor at predefined speeds is known. In the case of electric motor characteristic numbers below a so-called nominal speed, the maximum available drive torque is constant, while a maximum drive torque which decreases with 1/n occurs above this nominal speed n.

In one refinement, the ascertainment of the predicted drive torque of the electric motor is performed as a function of the power of a high-voltage battery which feeds the electric motor with energy. Since the maximum power of the electric motor and therefore the drive torque delivered thereby is restricted by the available battery power, it is particularly significant to also consider the power of the high-voltage battery, since it represents a focal point in the analysis of the actual driving behavior of the electric motor.

The ascertainment of the predicted drive torque of the electric motor is advantageously performed at the latest before reaching a value of a maximum drive torque of the electric motor which is decreased by the torque reserve. The establishment of the calculation point in time of the predicted drive torque ensures that the electric motor always provides a sufficiently large drive torque, with the aid of which not only the driving operation of the hybrid vehicle, but rather also smooth dragging of the internal combustion engine may be ensured.

In one refinement, the beginning of the start phase of the internal combustion engine is initiated by a control signal, if the predicted drive torque of the electric motor is less than or equal to the instantaneously measured drive torque of the electric motor, which is increased by the torque reserve, whereby engaging of a clutch between the internal combustion engine and the electric motor is initiated. An end of the start phase of the internal combustion engine is reached when the clutch is completely engaged. The beginning and the end of the start phase of the internal combustion engine, which always last a few fractions of a second, may thus be precisely established, whereby the speeds on which the calculation of the predicted drive torque is based may be precisely determined.

In one embodiment, the drive torque represents a push-start torque of the internal combustion engine, which may be designed to be constant or variable. It is thus ensured that sufficient drive torque is always available for dragging the internal combustion engine.

Another refinement of the present invention relates to a device for determining the beginning of a start phase of an internal combustion engine in a hybrid vehicle, in which a second drive unit drives the hybrid vehicle, the internal combustion engine being started upon reaching a certain drive torque of the second drive unit. In order to always achieve the maximum driving range of the second drive unit and simultaneously improve the driving comfort of the hybrid vehicle through an optimization of the internal combustion engine start triggering, means are provided which start the internal combustion engine when a predicted drive torque of the second drive unit is less than or equal to the drive torque of the second drive unit, as instantaneously measured and increased by a torque reserve. Fixed application values, which either cause an excessively early start of the internal combustion engine, whereby the driving range of the second drive unit is restricted excessively early, or an excessively late start of the internal combustion engine, which causes a collapse of the vehicle acceleration and therefore a perceptible comfort loss by a jerk in the vehicle, may therefore be dispensed with.

The second drive unit, which is designed as an electric motor, is advantageously connected to a control unit, which calculates the predicted drive torque of the electric motor and compares it to the instantaneously measured drive torque of the electric motor, and which activates a clutch, which is situated between the electric motor and the internal combustion engine, to disengage or to engage. Through the continuous monitoring of the predicted drive torque of the electric motor, the control unit allows the maximum drive torque of the electric motor available at any point in time to be sufficient to drive the vehicle electrically and to start the internal combustion engine smoothly.

In one embodiment, the electric motor is situated on a shaft of the internal combustion engine, which allows a simple construction of the drivetrain of the hybrid vehicle.

BRIEF DESCRIPTION OF THE DRAWINGS

The present invention permits numerous possible embodiments, one of which will be explained in greater detail on the basis of the figures.

Identical features are identified by identical reference numerals.

DETAILED DESCRIPTION OF EXAMPLE EMBODIMENTS

Figure 1:
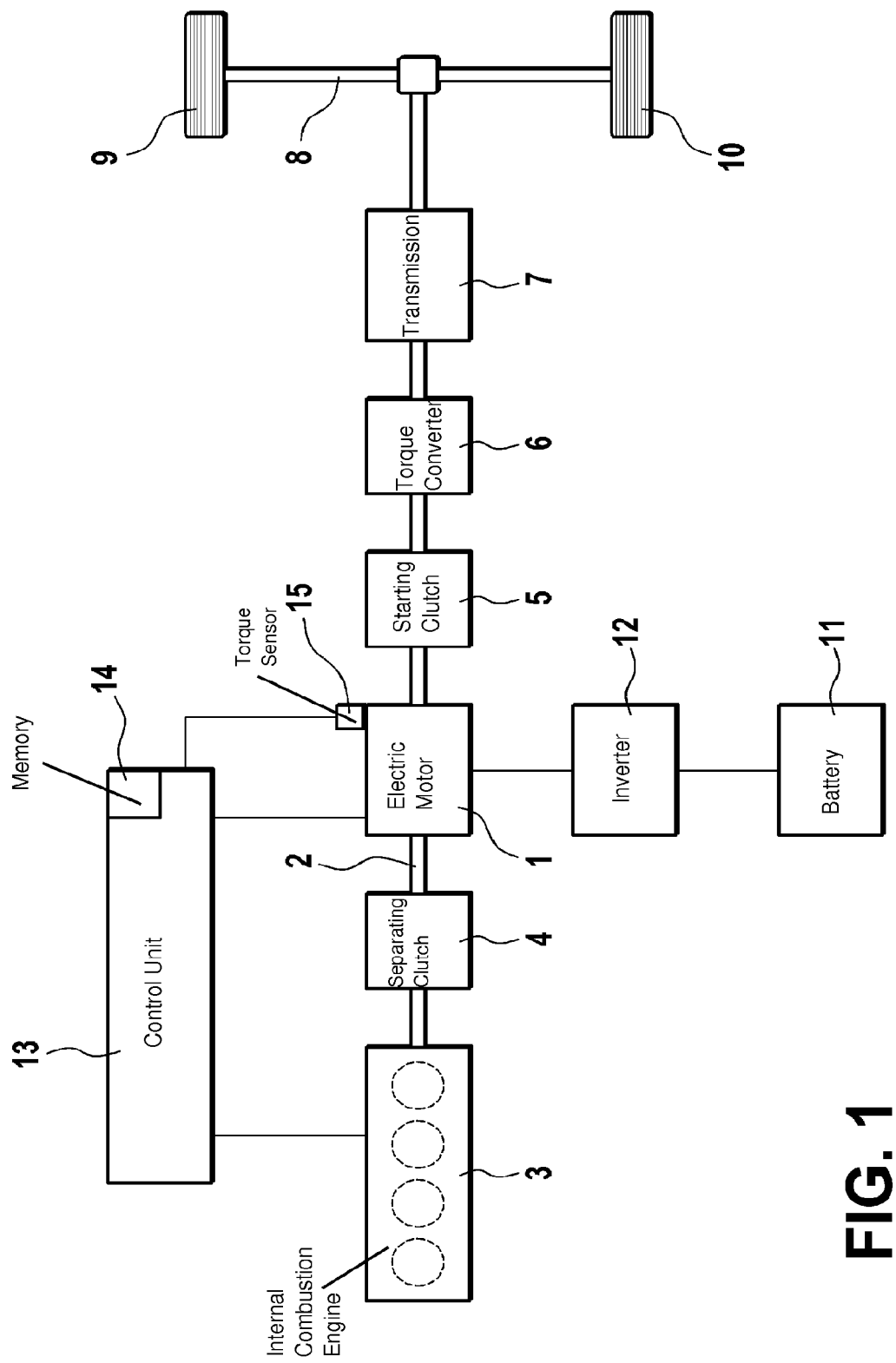
FIG. 1 shows a schematic view of a hybrid vehicle implemented as a parallel hybrid.

FIG. 1 shows a hybrid vehicle designed as a parallel hybrid. In this design, an electric motor 1 is situated on drive shaft 2 of an internal combustion engine 3. Internal combustion engine 3 is connected via a separating clutch 4 to electric motor 1. Electric motor 1 leads via a starting clutch 5 to a torque converter 6, which is connected to a transmission 7. Transmission 7 is led to an axle 8, on which wheels 9, 10 are situated, which are driven by the described drivetrain.

Electric motor 1 is supplied with energy by a high-voltage battery 11, which is connected via an inverter 12 to electric motor 1. Electric motor 1 and internal combustion engine 3 are controlled by a control unit 13. Control unit 13 includes a memory 14, in which characteristic curves for various operating parameters are stored.

There are various operating ranges in which a parallel hybrid may be operated. A first operating range, in which separating clutch 4 is disengaged and internal combustion engine 3 is disconnected from the drivetrain and is automatically stopped, is referred to as eDrive, since the hybrid vehicle is merely powered electrically by electric motor 1 and the energy stored in high-voltage battery 11. If there is a need for torque which can no longer be supplied by electric motor 1 alone, internal combustion engine 3 is automatically started and coupled to the drivetrain, which is performed by engaging separating clutch 4. Internal combustion engine 3 now contributes to driving the hybrid vehicle. To engage separating clutch 4, control unit 13 outputs an engagement command to separating clutch 4. At this point in time, the start phase of internal combustion engine 3 begins. The start phase ends when separating clutch 4 is completely engaged and internal combustion engine 3 has completed the first injections and ignitions and/or is capable of running independently. This start phase lasts multiple fractions of a second because of the inertia of both internal combustion engine 3 and also the separating clutch.

Internal combustion engine 3 is dragged by electric motor 1, the start phase of internal combustion engine 3 extending over the explained period of time, since internal combustion engine 3 must be accelerated or brought from the speed zero to a minimum speed, before it may provide a contribution to the driving operation of the hybrid vehicle.

Figure 2:
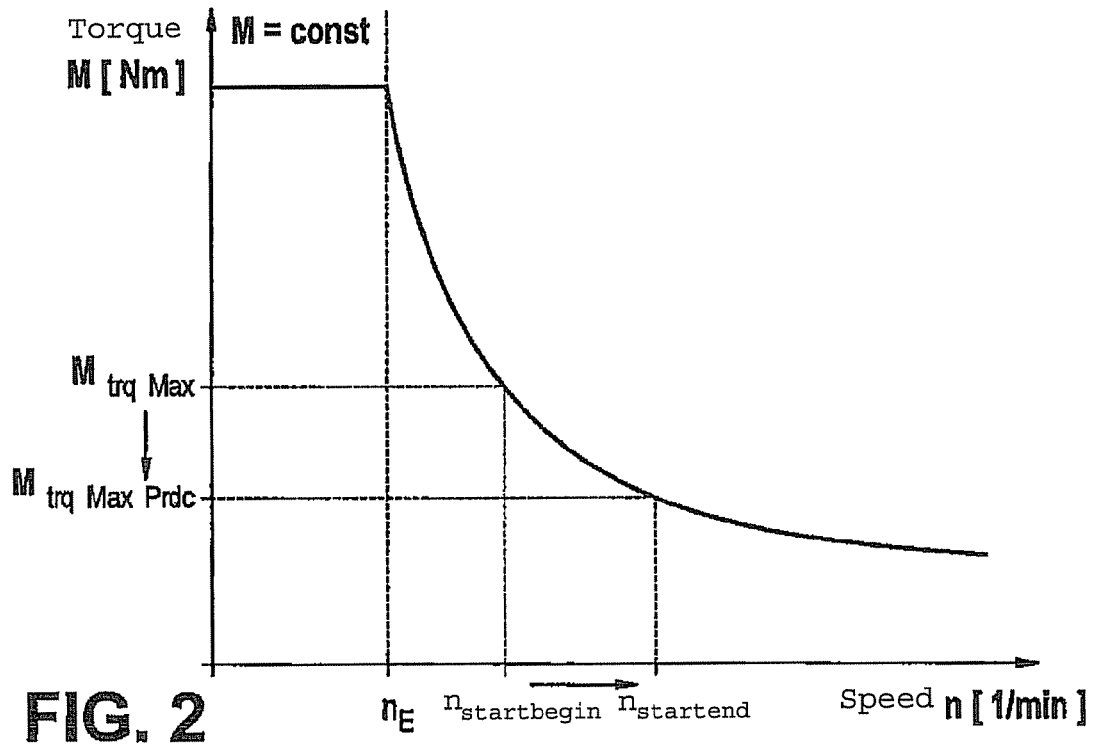
FIG. 2 shows torque/speed behavior of the electric motor at constant power.

In electric motor 1, the maximum drive torque of the electric motor changes as a function of the speed, as is apparent from FIG. 2. Above a nominal frequency $f_E$ or below speed $n_E=1/f_E$ resulting therefrom, maximum available drive torque M of electric motor 1 is constant. At speeds of the electric motor above so-called nominal speed $n_E$, electric motor 1 is operated at most on a curve of constant power. With rising speed n, this results in a drive torque M which sinks with 1/n. If internal combustion engine 3 is now to be started, which may be triggered by a driver intended torque, for example, electric motor 1 has an instantaneous drive torque $M_{trqMax}$, at speed$_{Startbegin}$, at the moment at which control unit 13 outputs an engagement command to separating clutch 4. In the internal combustion engine starting situation of FIG. 2, speed n of electric motor 1 rises, for example. In addition to the drive torque, electric motor 1 must also apply the drag torque of internal combustion engine, which is determined by friction and acceleration components. At the point in time of the end of the internal combustion engine starting situation, i.e., when separating clutch 4 is completely engaged and internal combustion engine 3 completely provides a concrete contribution to the drive torque of the hybrid vehicle, electric motor 1 only has a drive torque $M_{trqMaxPrdc}$ at a speed $n_{Startend}$.

Figure 3:
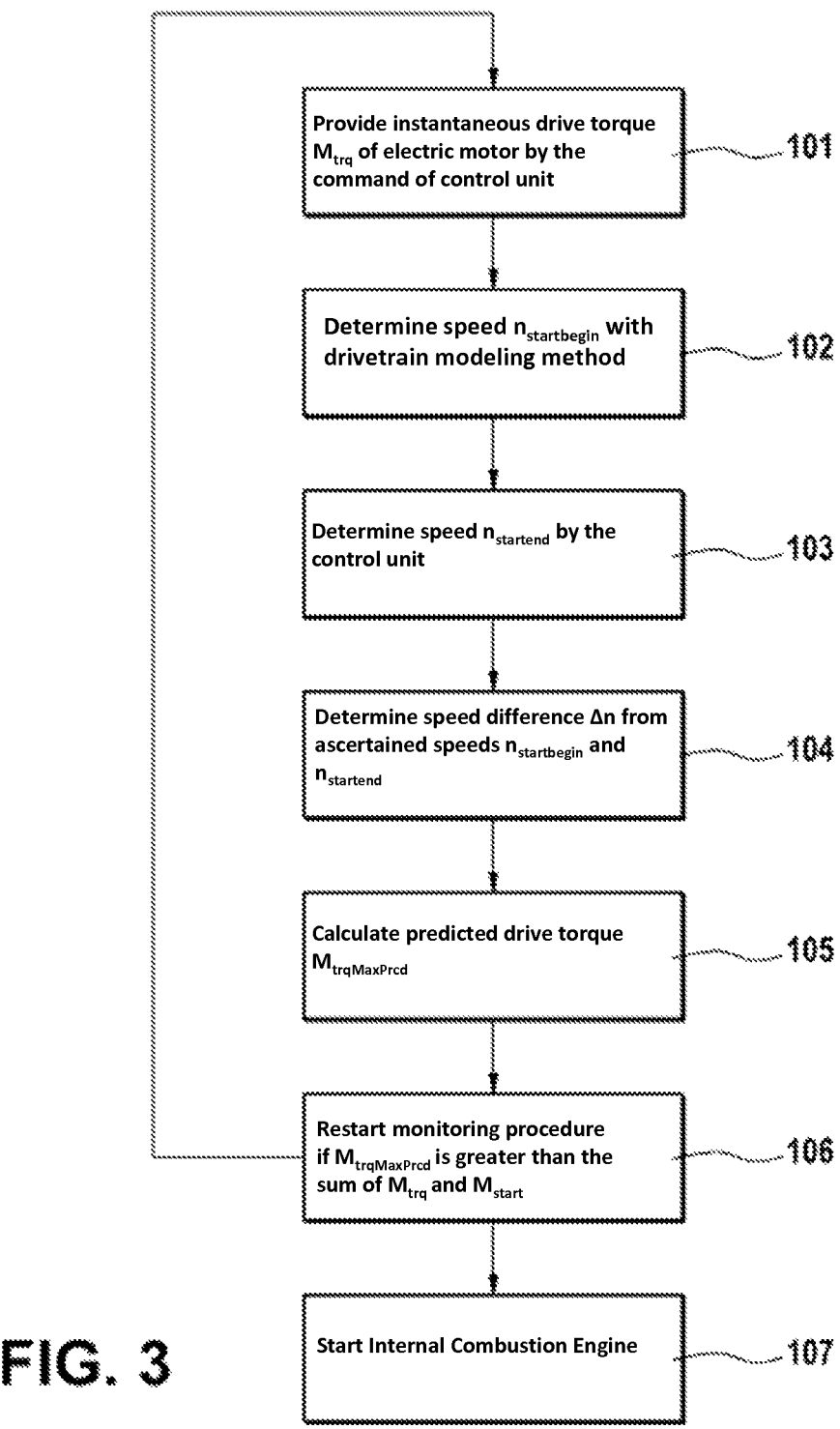
FIG. 3 shows a schematic flow chart of an exemplary embodiment of the method according to the present invention.

One possible specific embodiment of the method according to the present invention will be explained with the aid of FIG. 3. In block 101, instantaneous drive torque $M_{trq}$ of electric motor 1 is provided by the command of control unit 13, e.g., by torque sensor 15 or by an intelligent inverter (activation unit of the electric motor). In addition, a fixed value of 50 Nm is stored in memory 14 as torque reserve $M_{Start}$ for dragging internal combustion engine 3.

Speed $n_{Startbegin}$, which is associated with instantaneous drive torque $M_{trq}$, is determined in block 102 by the method of drivetrain modeling. However, it is also possible to determine it with the aid of an additional speed sensor (not shown), which measures the speed at the output of electric motor 1. In block 103, control unit 13 determines speed $n_{Startend}$ beforehand. This is performed, e.g., either by extrapolation of the speed on the basis of a preceding speed development or a current speed development or on the basis of the driver intended torque requested by the driver and a speed development derived therefrom.

A speed difference Δn is determined from ascertained speeds $n_{Startbegin}$ and $n_{Startend}$ in block 104, which may be used to estimate the speed at the start end, $$\Delta n = n_{Startend} - n_{Startbegin} \qquad (1).$$

Therefore, $n_{Startend} = \Delta n + n_{Startbegin}$.

In the event of a displayed gear change of the hybrid vehicle, speed difference Δn is corrected directly via the known transmission ratio of transmission 7.

To determine the predicted torque, control unit 13 may calculate predicted drive torque $M_{trqMaxPrd}$ in block 105 taking into account nominal speed $n_e$ of electric motor 1 from the formula $$M_{trqMaxPrd} = M_{trqMax} \times (n_{Startbegin}/n_{Startend}) \qquad (2),$$

if one of the two speeds $n_{Startend}$ or $n_{Startbegin}$ is greater than nominal speed $n_e$.

If electric motor speed range $n_{Startend}$ is less than/equal to nominal speed $n_e$ and $n_{Startbegin}$ is less than/equal to nominal speed $n_e$, the maximum drive torque is represented in idealized form as nearly independent of the instantaneous electric motor speed and therefore $M_{trqMaxPrd} = M_{trqMax}$.

In block 106, torque reserve $M_{Start}$ is added to instantaneously measured drive torque $M_{trq}$ and compared to previously calculated drive torque $M_{trqMaxPrd}$. If predicted drive torque $M_{trqMaxPrd}$ is less than or equal to the sum of instantaneously measured drive torque $M_{trq}$ and torque reserve $M_{Start}$, the internal combustion engine is immediately started in block 107, in that control unit 13 outputs a signal for engaging separating clutch 4 or for the start beginning of the internal combustion engine (internal combustion engine start triggering). If predicted drive torque $M_{trqMaxPrd}$ is greater than the sum of instantaneously measured drive torque $M_{trq}$ and torque reserve $M_{Start}$, the sequence returns from block 106 to block 101 and the monitoring procedure is restarted.

Figure 4:
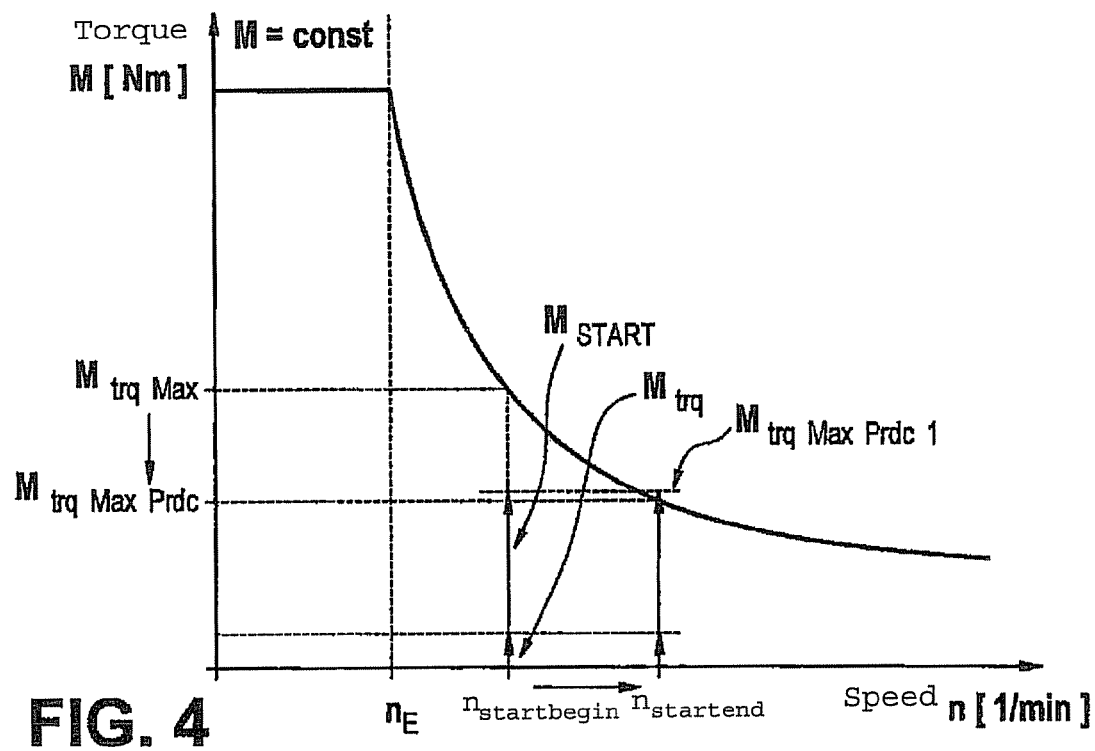
FIG. 4 shows an example of a start triggering of the internal combustion engine on the basis of the torque/speed graph of the electric motor.

FIG. 4 shows a representation of the start triggering of the internal combustion engine on the basis of the torque/speed graph of the electric motor. At the start beginning, an instantaneous drive torque $M_{trq}$ is measured, to which constant torque reserve $M_{Start}$ is added. Predicted drive torque $M_{trqMaxPrd1}$ is greater than the sum of instantaneously measured drive torque $M_{trq}$ and torque reserve $M_{Start}$ in this specific embodiment, because of which internal combustion engine 3 may not be started smoothly in the case of this combination. If predicted drive torque $M_{trqMaxPrd2}$ is only slightly less than instantaneously measured drive torque $M_{trq}$ and torque reserve $M_{Start}$ or is equal thereto, internal combustion engine 3 is started immediately to ensure a smooth start.

Figure 5:
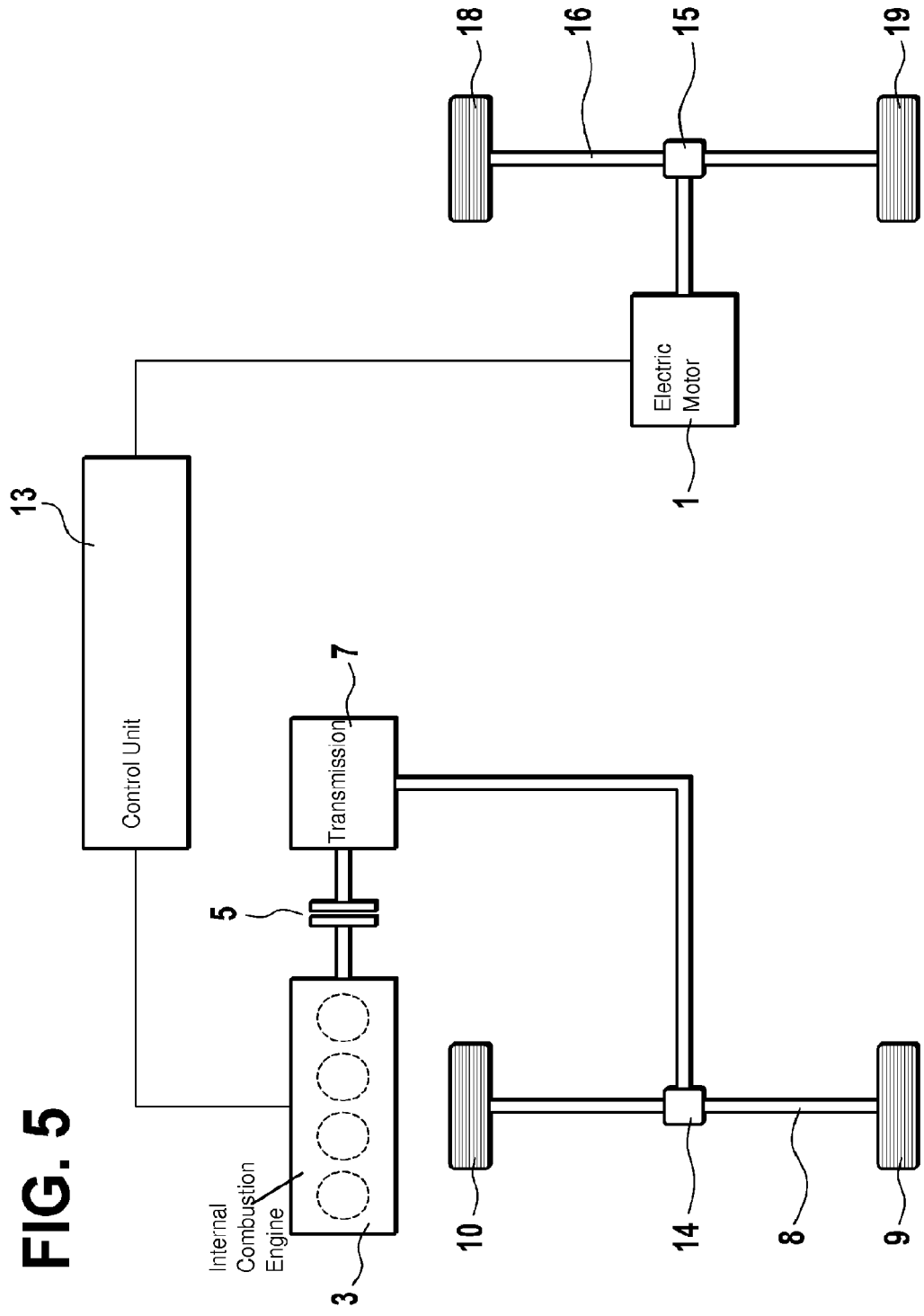
FIG. 5 shows a schematic view of a hybrid vehicle implemented as an axle hybrid.

In hybrid vehicles having a nonparallel hybrid construction, e.g., in the case of an axle 16 which is operated solely electrically independently of internal combustion engine 3, as shown in FIG. 5, in which electric motor 1 provides independent axle 16 with the drag torque of internal combustion engine 3, first of all instantaneous drive torque $M_{trq}$ of electric motor 1 must be converted via further transmission and/or differential ratios and secondly torque reserve $M_{Start}$ must be converted via further transmission and/or differential ratios and/or tire radii, in order to be able to perform the torque comparison of predicted torque $M_{trqMaxPrd}$ to instantaneous drive torque $M_{trq}$ and an added torque reserve $M_{Start}$ of electric motor 1, e.g., based on a wheel torque.

In the axle hybrid shown in FIG. 5, internal combustion engine 3 is connected via starting clutch 5 to transmission 7, which leads to a differential 14, which is situated on first axle 8, by which wheels 9, 10 are driven. Independently thereof, electric motor 1 is connected to a second differential 15, which is situated on second axle 16, which drives wheels 18, 19. Control unit 13 leads both to electric motor 1 and also to internal combustion engine 3.

The principle for ascertaining the point in time of the internal combustion engine start triggering or the beginning of the start phase of internal combustion engine 3 may also be applied as described in the case of an axle hybrid.

What is claimed is:

1. A method for determining a beginning of a start triggering of an internal combustion engine in a hybrid vehicle, in which a second drive unit drives the hybrid vehicle, the internal combustion engine being started upon reaching a certain drive torque of the second drive unit, the method comprising:
   measuring, instantaneously, a drive torque of the second drive unit;
   increasing the drive torque by a torque reserve;
   predicting a drive torque for the second drive unit; and
   determining the beginning of the start triggering of the internal combustion engine when the predicted drive torque of the second drive unit is less than or equal to the drive torque.

2. The method as recited in claim 1, wherein the second drive unit is an electric motor and the predicted drive torque of the second drive unit is ascertained as a function of a speed change of the electric motor during a start phase of the internal combustion engine.

3. The method as recited in claim 2, wherein the speed change of the electric motor is determined from a speed at the beginning of the start phase of the internal combustion engine and a predetermined speed at an end of the start phase of the internal combustion engine, the speed at the beginning of the start phase of the internal combustion engine being determined at a point in time of the measurement of the instantaneous drive torque of the electric motor.

4. The method as recited in claim 3, wherein the speed change is assumed to be a constant value, which one of: i) is added to the speed ascertained at the beginning of the start phase of the internal combustion engine in the case of a rising speed curve, or ii) is subtracted therefrom in the case of a sinking speed curve.

5. The method as recited in claim 3, wherein the predetermined speed at the end of the start phase of the internal combustion engine is determined from one of a preceding or a current speed development of the electric motor.

6. The method as recited in claim 3, wherein the speed change is ascertained from an intended drive torque set by a driver of the hybrid vehicle.

7. The method as recited in claim 3, wherein the speed change is corrected, in the case of one of a displayed, ascertained, predicted or expected gear change of the hybrid vehicle, via a transmission ratio of a transmission.

8. The method as recited in claim 2, wherein the predicted drive torque of the electric motor is regularly repeated during the operation of the electric motor at predefined time intervals.

9. The method as recited in claim 2, wherein the predicted drive torque of the electric motor is ascertained one of at a speed at the beginning of a start phase or at a predetermined speed greater than the nominal speed of the electric motor at a nearly constant power.

10. The method as recited in claim 2, wherein the predicted drive torque of the electric motor is ascertained as a function of power of a high-voltage battery which supplies the electric motor with energy.

11. The method as recited in claim 2, wherein the predicted drive torque of the electric motor is ascertained at latest before reaching a value of a maximum drive torque of the electric motor which is reduced by the torque reserve.

12. The method as recited in claim 2, wherein a beginning of the start phase of the internal combustion engine is initiated by a control signal when the predicted drive torque of the electric motor is less than or equal to the drive torque, as instantaneously measured and increased by a torque reserve, of the electric motor, whereby engagement of a clutch between the internal combustion engine and the electric motor is initiated, and an end of the start phase of the internal combustion engine is reached when the clutch is completely engaged and the internal combustion engine at least one of has completed first injections and ignitions, and is capable of running independently.

13. The method as recited in claim 1, wherein the torque reserve represents a drag torque of the internal combustion engine.

14. A device for determining a beginning of a start phase of an internal combustion engine in a hybrid vehicle, in which a second drive unit drives the hybrid vehicle, the internal combustion engine being started upon reaching a certain drive torque of the second drive unit, the device comprising:
   an arrangement to measure, instantaneously, a drive torque of the second drive unit;
   an arrangement to increase the drive torque by a torque reserve;
   an arrangement to predict a drive torque of the second drive unit; and
   an arrangement to determine the beginning of the start triggering of the internal combustion engine when the predicted drive torque of the second drive unit is less than or equal to the drive torque.

15. The device as recited in claim 14, wherein the second drive unit is an electric motor and is connected to a control unit, which calculates the predicted drive torque of the electric motor and compares it to the sum of the instantaneously measured drive torque of the electric motor and the torque reserve, and which activates a clutch situated between the electric motor and internal combustion engine to disengage or to engage.

16. The device as recited in claim 15, wherein the electric motor is situated on a drivetrain of the internal combustion engine.

17. The device as recited in claim 15, wherein the second drive unit is an electric motor which drives a first axle of the vehicle, while the internal combustion engine drives a second axle of the vehicle, which is independent from the first axle, the electric motor being connected to the control unit, which corrects the predicted drive torque and instantaneous drive torque and an added torque reserve by one of a particular gear, differential ratios, and tire radii, and performs torque comparison, in which the predicted drive torque is less than or equal to the instantaneously measured drive torque and an added torque reserve.

* * * * *